(12) United States Patent
Petrovic et al.

(10) Patent No.: US 9,380,253 B2
(45) Date of Patent: Jun. 28, 2016

(54) METHOD AND APPARATUS FOR BAND SELECTION, SWITCHING AND DIPLEXING

(71) Applicant: Entropic Communications, Inc., San Diego, CA (US)

(72) Inventors: Branislav Petrovic, La Jolla, CA (US); Yonghuang Zeng, San Diego, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 81 days.

(21) Appl. No.: 14/293,725

(22) Filed: Jun. 2, 2014

(65) Prior Publication Data

US 2015/0304596 A1    Oct. 22, 2015

Related U.S. Application Data

(60) Provisional application No. 61/981,629, filed on Apr. 18, 2014.

(51) Int. Cl.
| | |
|---|---|
| *H04N 5/50* | (2006.01) |
| *H04L 5/08* | (2006.01) |
| *H04N 5/38* | (2006.01) |
| *H04L 5/00* | (2006.01) |

(52) U.S. Cl.
CPC .. *H04N 5/50* (2013.01); *H04L 5/08* (2013.01); *H04N 5/38* (2013.01)

(58) Field of Classification Search
CPC ............... H04N 5/50; H04L 5/08; H04L 5/00
See application file for complete search history.

(56) References Cited

U.S. PATENT DOCUMENTS

| | | | | |
|---|---|---|---|---|
| 6,127,962 A | * | 10/2000 | Martinson | H03D 7/18 331/42 |
| 2004/0071111 A1 | * | 4/2004 | Satoh | H04B 1/52 370/329 |
| 2008/0132193 A1 | * | 6/2008 | Petrovic | H04B 1/28 455/323 |
| 2009/0115550 A1 | * | 5/2009 | Tsai | H01P 1/213 333/104 |
| 2014/0036744 A1 | * | 2/2014 | Zeng | H04L 5/00 370/297 |

\* cited by examiner

*Primary Examiner* — Brian Yenke
*Assistant Examiner* — Sean Haiem
(74) *Attorney, Agent, or Firm* — McAndrews, Held & Malloy Ltd.

(57) ABSTRACT

Systems and methods for selecting, combining and duplexing signals in a communications network. Several configurations of diplexers and channel selectors are disclosed which use filters, combiners and splitters to select and combine which the signals to be either received or transmitted.

13 Claims, 8 Drawing Sheets

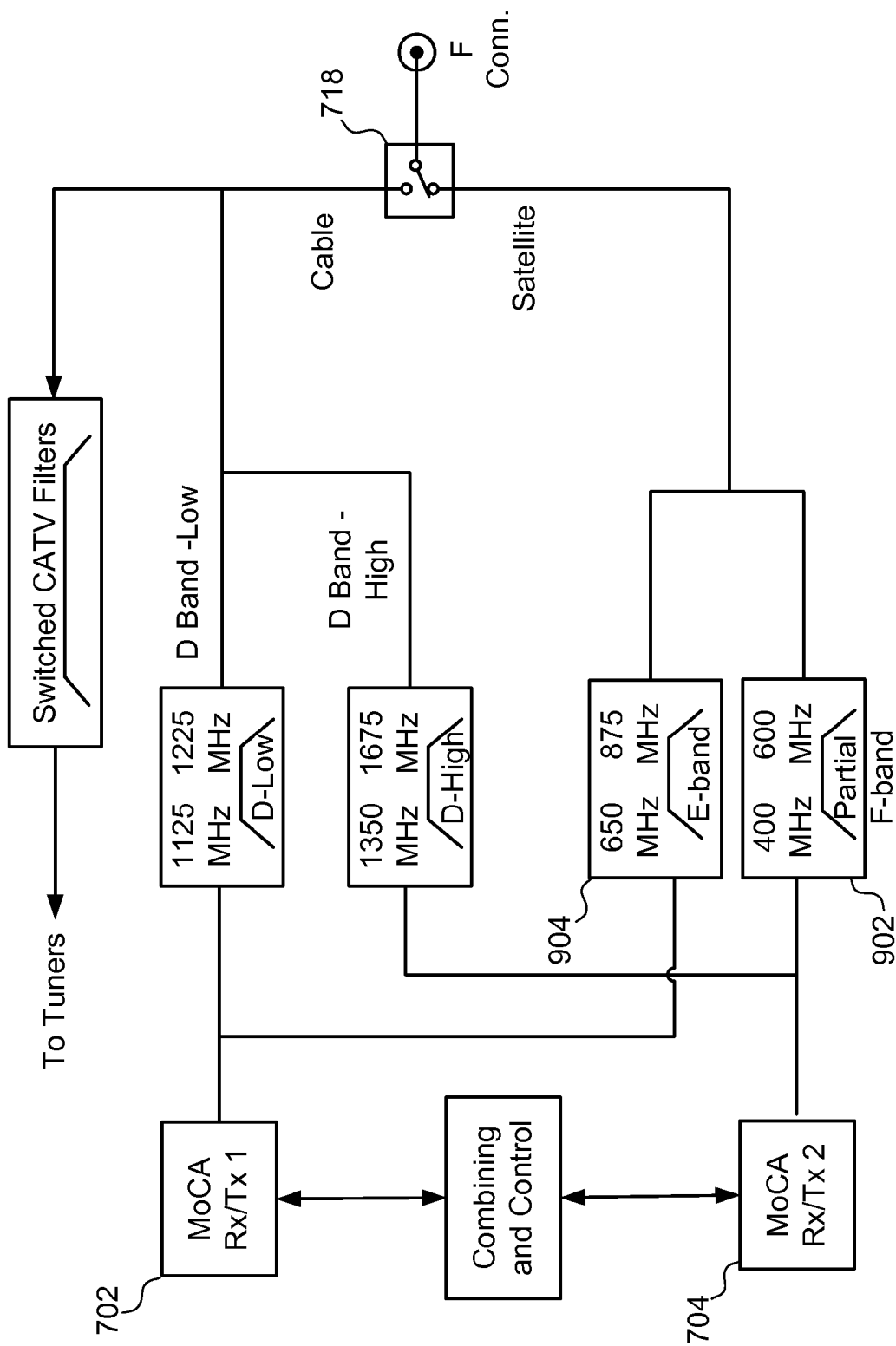

METHOD AND APPARATUS FOR BAND SELECTION, SWITCHING AND DIPLEXING

RELATED APPLICATIONS

This application claims priority benefit of U.S. Provisional Patent Application Ser. No. 61/981,629, filed Apr. 18, 2014 and entitled "Method and Apparatus for Band Selection, Switching and Diplexing", which is herein incorporated by reference in its entirety.

TECHNICAL FIELD

The disclosed method and apparatus relate to communications systems and more particularly to systems for selecting, combining and diplexing signals of a communications system.

BACKGROUND

In many cases, broadband receivers are used to receive signals from several sources. Frequently, one particular signal needs to be selected from among the signals received. Alternatively, more than one signal need to be combined to form a composite signal. Different signals may need to be combined for transmission together over a shared medium, such as coaxial cable within a home. For example, in a home entertainment network, signals may be received from various sources, such as satellite dishes, MoCA (Multimedia over Coax Alliance) networks, or cable television feeds. In some such cases, these signals must be combined for communication over a common medium, such as a coaxial cable that allows components within the home entertainment network to communication with one another.

FIG. 1 is a simplified block diagram of a signal selector 100. A first single pole-triple throw switch 102 is used to select one of three filters 104, 106, 108 to be connected to an input 110. A second single pole-triple throw switch 112 selects the output of the selected filter 104, 106, 108 to be coupled to the output 114 of the signal combiner 100. The first filter 104 has relatively low band pass frequency response that extends from a first frequency of approximately $f_1$ to a second frequency of approximately $f_2$. The second filter 106 has a relatively high band pass frequency response that extends from a third frequency of approximately $f_3$ to a fourth frequency of approximately $f_4$. The third filter 108 has a relatively wide bandpass frequency response that extends from the first frequency of approximately $f_1$ to approximately the fourth frequency of $f_4$. Accordingly, by setting the switches appropriately, the signals with a frequency of $f_1$ to $f_2$ that are present at the input 110 can be selected to be coupled through to the output by selecting the first position in both the input switch 102 and the output switch 114. Likewise, by setting the input and output switches 102, 114 to the second position, signals with a frequency of $f_3$ to $f_4$ that are present at the input 110 can be selected to be coupled through to the output. Finally, by setting the input and output switches 102, 114 to the third position, signals with a frequency of $f_1$ to $f_4$ that are present at the input 110 can be selected to be coupled through to the output.

While this arrangement works well, the fact that it requires two single pole, triple throw switches causes the selector 100 to have a relatively high loss from the input 110 to the output 114. Furthermore, the two switches add distortion to the signal. Therefore, there is presently a need for a low loss signal combiner that can select between different filters inexpensively.

In the context of a home entertainment network, selection of signals carried on several different frequency bands is necessary. FIG. 2 is a simplified block diagram of a universal MoCA diplexer 200. The diplexer 200 has six filters 202, 204, 206, 208, 210, 212. Three of the filters 202, 204, 206 are used to select satellite television signals and MoCA signals. Another two filters 208, 210 are used to select MoCA. The MoCA band is selected based upon whether the frequency band will be shared by satellite television or cable television signals. When satellite signals are present, MoCA signals are modulated on the E-band (500 MHz to 600 MHz) or F-band (675 MHz to 850 MHz). When used with cable television signals, MoCA is typically modulated on the D-band (1150 MHz to 1500 MHz). The sixth filter 212 is used to select cable television (CATV) signals. Two multi-throw switches 214, 216 are used to select which filter from among the five filters 202, 204, 206, 208, 210 is to be coupled to the output 218 and which filter is to be coupled to the input 220. A single pole, single throw switch 222 is used to connect the input 220 to the CATV filter 212.

The use of multi-throw switches increases the loss in the circuit substantially. Therefore, there is a need for a universal diplexer that can select from among several frequency bands without encountering the substantial losses associated with multi-throw switches.

SUMMARY

Various embodiments of the disclosed method and apparatus for selecting, combining and duplexing signals are presented. In accordance with one embodiment of the disclosed method and apparatus, an input signal is coupled to two filters. The first filter has a relatively low pass band. The second filter has a relatively high pass band. In one embodiment the 3 dB cutoff at the high end of the low pass filter is at the same frequency as the 3 dB cutoff at the low end of the high pass filter. A single pole, single throw switch coupled to the output of the filters selects between one, the other or both filters. The output of the two switches are coupled to two inputs to a combiner/splitter. In another embodiment, amplifiers are provided between the filter and the switch.

In another embodiment, a receive/transmit diplexer is achieved using two single pole, double throw (SPDT) switches, one at the output of each filter. The two SPDT switches select between transmit and receive modes. In receive mode, each SPDT switch allows the associated filter to be selectively coupled to a low noise amplifier (LNA) for amplifying received signals output from the filter. In transmit mode the switches couple a power amplifier (PA) to the filters to amplify signals to be transmitted prior to entering the filter. The input to each PA is coupled to one of two inputs to a splitter. The splitter receives an input signal to be transmitted. The signal is split and the output coupled to the two PAs. The output of each PA is coupled to one of the throws of one of the two SPDT switches. In receive mode, a combiner receives the output from the two LNAs. Each LNA is coupled to the output of one of the filters through the second throw of one of the SPDT switches.

In another embodiment, a MoCA universal diplexer is achieved using two SPDT switches. The first of the two switches is used to select whether a first group of filters or a second group of filters are coupled to an F connector. The F connector couples the filters to a coaxial cable for receiving and transmitting to the networks. The first group of filters include an E-band and an F-band filter. The second group of filters include a D-band low filter, a D-band high filter and a set of switched CATV filters. The second of the two switches is used to select between the E-band and an F-band filter. In an alternative embodiment of the MoCA universal diplexer, the second SPDT switch is eliminated. This is achieved by limiting the F-band filter to frequencies that do no overlap with the frequencies of the E-band filter. Therefore, the outputs of the E-band filter and the partial F-band filter can be directly coupled to the first switch (i.e., both can be selected concurrently).

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 9 is a simplified block diagram of an alternative embodiment of a universal diplexer.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 3:
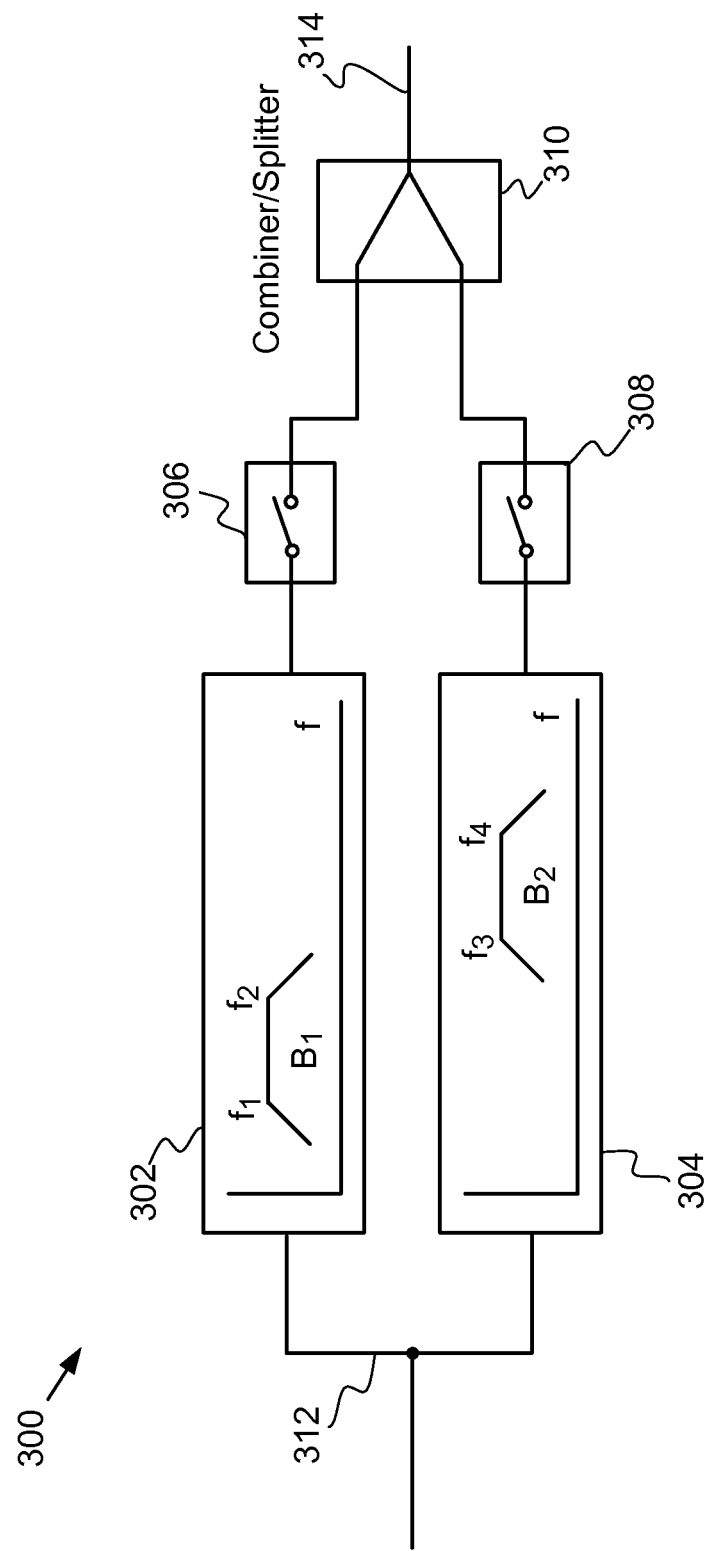
FIG. 3 is a simplified block diagram of a passive band switch in accordance with the disclosed method and apparatus.

FIG. 3 is a simplified block diagram of a passive band switch 300 in accordance with the disclosed method and apparatus. The band switch 300 includes a first filter 302, a second filter 304, a first SPST switch 306, a second SPST switch 308 and a combiner/splitter 310. Signals in one of three frequency bands (high, low and bandpass band) can be selected by selectively opening or closing the first and second SPDT switches 306, 308. The first filter 302 has a relatively low pass-band, having a low frequency 3 dB cutoff at a first frequency $f_1$ and high frequency 3 dB cutoff at a second frequency $f_2$. The second filter has a low frequency 3 dB cutoff at a third frequency $f_3$ and a high frequency 3 dB cutoff at a fourth frequency $f_4$. The third frequency $f_3$ can be any frequency equal to or greater than the second frequency $f_2$. The two filters 302, 304 are coupled together at a common connection point 312 at a first terminal of each filter 302, 304. A second terminal of the first filter 302 is coupled to the first terminal of the first switch 306. The second terminal of the first switch 306 is coupled to a first isolated port of the combiner/splitter 310. A second terminal of the second filter 304 is coupled to the first terminal of the second switch 308. The second terminal of the second switch 308 is coupled to the second isolated port of the combiner/splitter 310.

It should be noted that because the band switch 300 is passive, it can be used for receiving signals at the common port 314 of the combiner/splitter 310 and passing them through to the common port 312. Alternatively, operation in the opposite direction is possible. That is, signals can be received at the filter common port 312 and the output of the filters combined at the combiner/splitter 310 to be output at the port 314. The combiner/splitter 310 provides isolation that prevents the filters from interacting badly with one another (e.g., forming resonant circuits that may oscillate, etc.).

The band switch 300 has three modes. The first mode is "low pass" mode. In low pass mode, the first switch 306 is closed and the second switch 308 is open. Accordingly, if an input signal is applied to the common connection point 312, the output at the common port 314 of the combiner/splitter 310 will have only those frequencies passed by the first filter 302. Likewise, if an input signal is applied to the common port 314 of the combiner/splitter 310, the output at the common connection point 312 will have only those frequencies passed by the first filter 302.

The second mode is "high pass" mode. In high pass mode, the first switch 306 is open and the second switch 308 is closed. Accordingly, if an input signal is applied to the common connection point 312, the output at the common port 314 of the combiner/splitter 310 will have only those frequencies passed by the second filter 304. Likewise, if an input signal is applied to the common port 314 of the combiner/splitter 310, the output at the common connection point 312 will have only those frequencies passed by the second filter 304.

The third mode is "band pass" mode. In band pass mode, both switches 306, 308 are closed. In band pass mode, when the third frequency $f_3$ is equal to the second frequency $f_2$, the frequency response through the band switch 300 will be relatively flat across the band from $f_1$ to $f_4$. The combiner/splitter 310 provides isolation between the two filters 302, 304 and the two switches 306, 308. Therefore, switching between modes will not cause distortion at the common port 314 of the combiner/splitter 310. In addition, the combiner/splitter 310 allows the two filters 302, 304 to be used together to make a composite band pass filter that will allow signals in the range from $f_1$ to $f_4$ to pass from the input to the output without the need for a third filter.

By eliminating one switch and using a SPST switch rather than a SPSD switch, the loss through the band switch 300 is reduced. However, the addition of the combiner/splitter 310 offsets some of the gains achieved by simplifying the switches.

Figure 4:
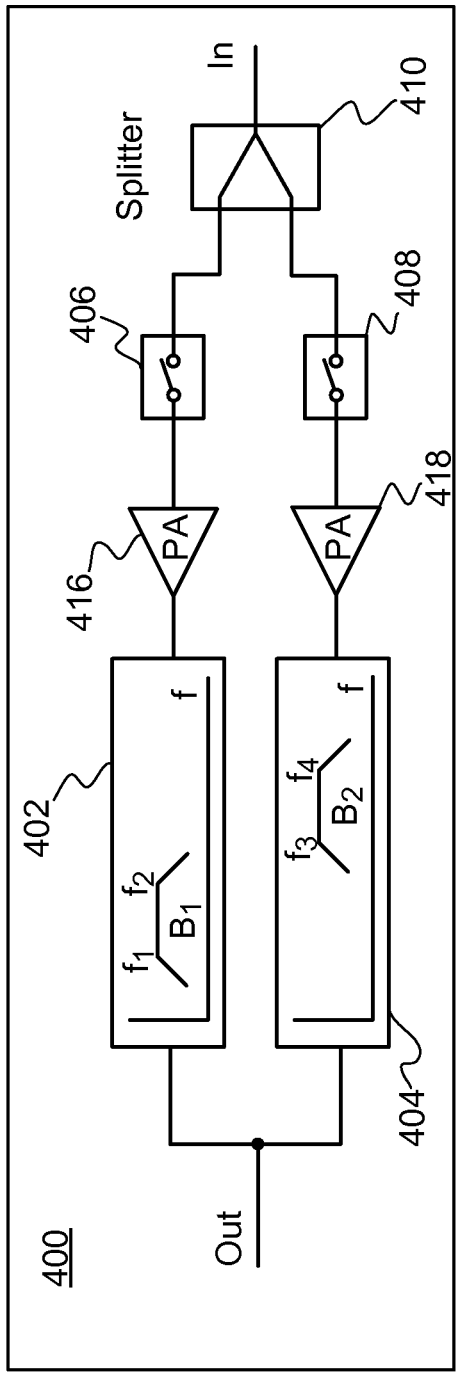
FIG. 4 is a simplified block diagram of an active transmitter band switch.

FIG. 4 is a simplified block diagram of an active transmitter band switch 400. Two power amplifiers (PAs) 416, 418 are included. A signal to be transmitted is coupled to the common port of a splitter 410. A first isolation port of the splitter 410 is coupled to a first terminal of a first switch 406. The input of the first PA 416 is coupled to a second terminal of the first switch 406. The output of the PA 416 is coupled to a first terminal of a first filter 402. A second isolation port of the splitter 410 is coupled to the first terminal of a second switch 408. The input to the second PA 418 is coupled to a second terminal of the second switch 408. The output of the second PA 418 is coupled to a first terminal of a second filter 404. Due to the use of active components (i.e., the PAs 416, 418), the band switch 400 can only be used for transmitting. In a manner similar to that described with respect to the band switch 300, the active transmitter band switch 400 has three modes: "low pass" mode; "high pass" mode and "band pass" mode. Using the switches 406, 408 in a similar manner to that described above, one of the three modes can be selected. In an alternative embodiment, each power amplifier 416, 418 can be placed between the splitter 410 and the respective switch 406, 408.

Figure 5:
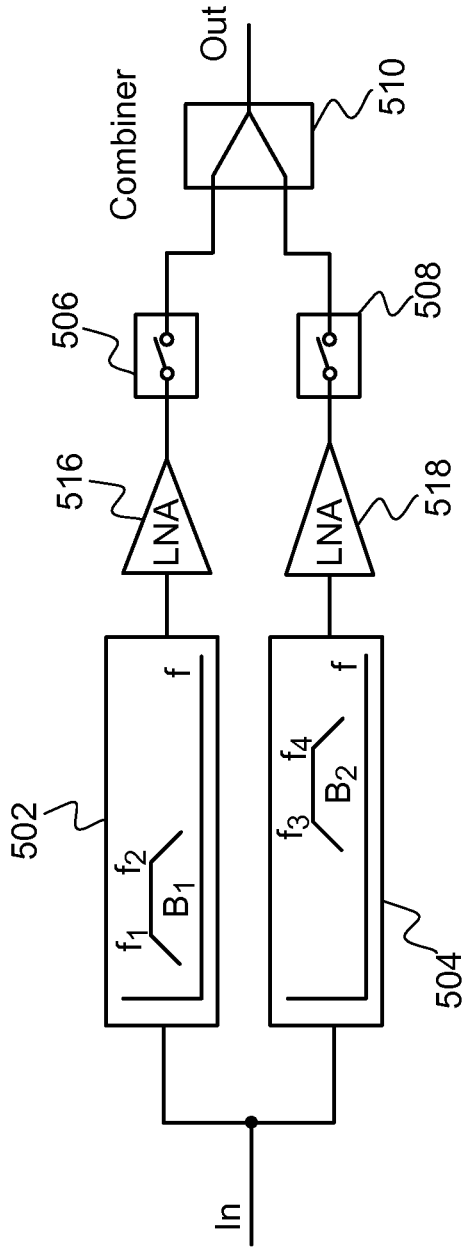
FIG. 5 is a simplified block diagram of a receiver band switch.

FIG. 5 is a simplified block diagram of a receiver band switch 500. In the receiver band switch 500, two low noise amplifiers (LNAs) 516, 518 are used. An input signal is received at a common connection point 512. The input signal is coupled to a first terminal of each of two filters 502, 504. A second terminal of the first filter 502 is coupled to the input of the first LNA 516. The output of the first LNA 516 is coupled to a first isolation port of a combiner 510. A second terminal of the second filter 504 is coupled to the input of the second LNA 518. The output of the second LNA 518 is coupled to the second isolation port of the combiner 510. In a manner similar to that described with respect to the band switch 300, the active receiver band switch 500 has three modes: "low pass" mode; "high pass" mode and "band pass" mode. Using the switches 406, 408 in a similar manner to that described above, one of the three modes can be selected. In an alternative embodiment, each low noise amplifier 516, 518 can be placed between the combiner 510 and the respective switch 506, 508.

Figure 1:
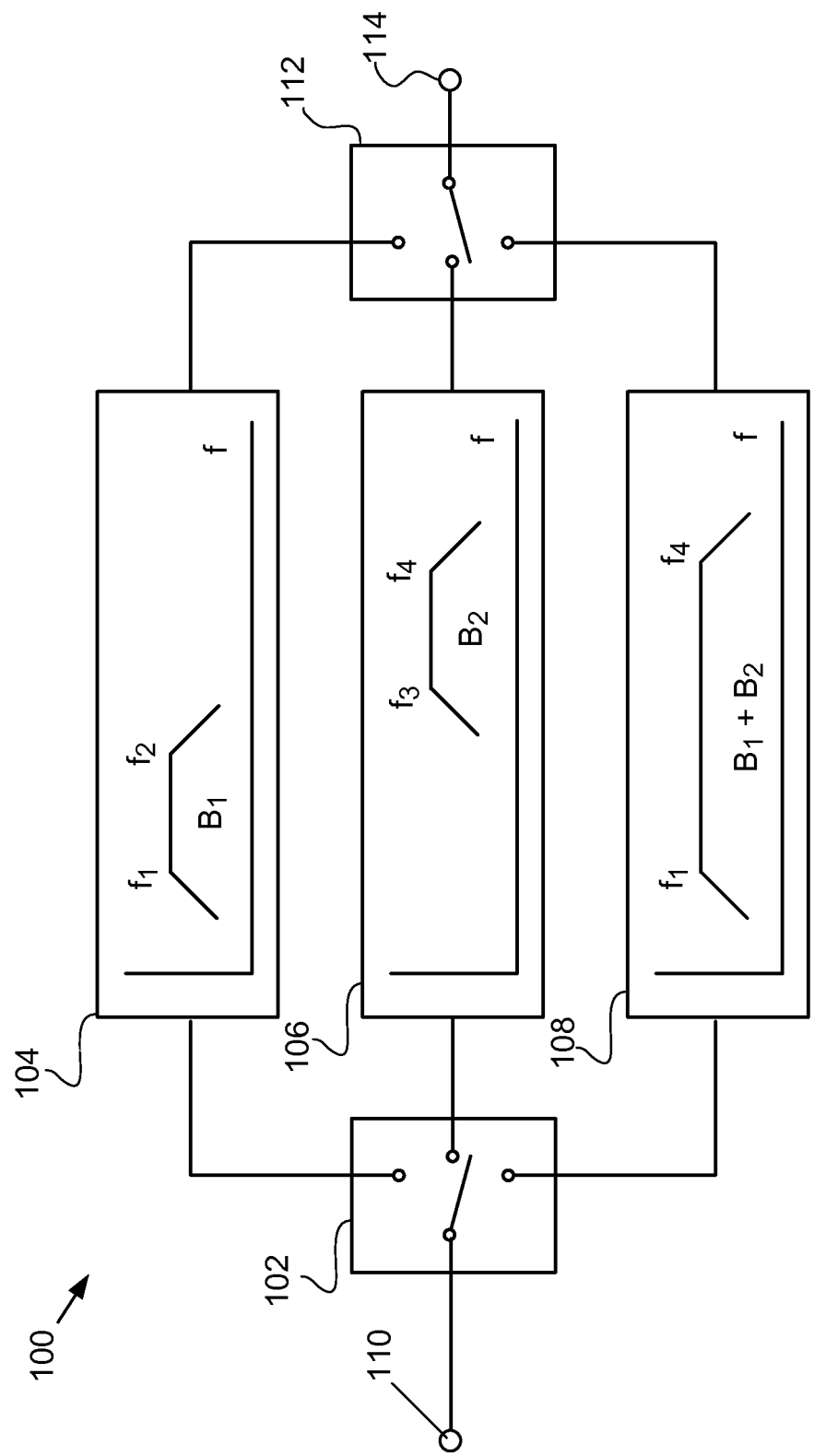
FIG. 1 is a simplified block diagram of a prior art signal selector.
Figure 2:
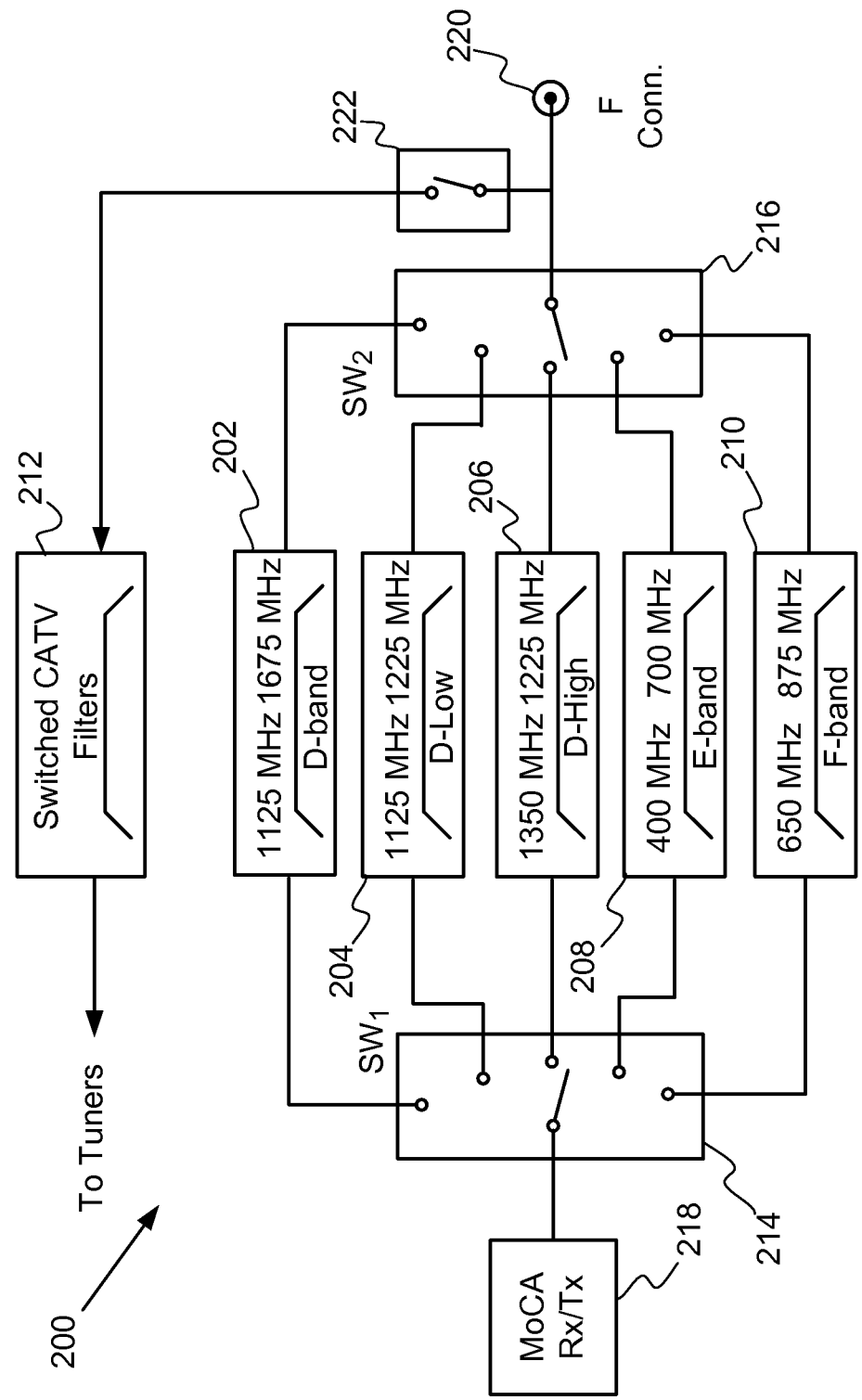
FIG. 2 is a simplified block diagram of a prior art universal MoCA diplexer.

The use of active elements in the transmitter band switch 400 and receiver band switch 500 provide gain that compensates for losses incurred in the filter and splitter/combiner. It should be noted that removing the switch 102 from the prior art band switch 100 shown in FIG. 1 will reduce the noise figure incurred in the band switch 500. It can be seen that, even though there is an additional loss incurred due to the combiner 510, that loss occurs after the LNA. Thus, the noise figure of the receiver band switch 500 will be better than would be the case if an LNA were introduced in the band switch 100.

Figure 6:
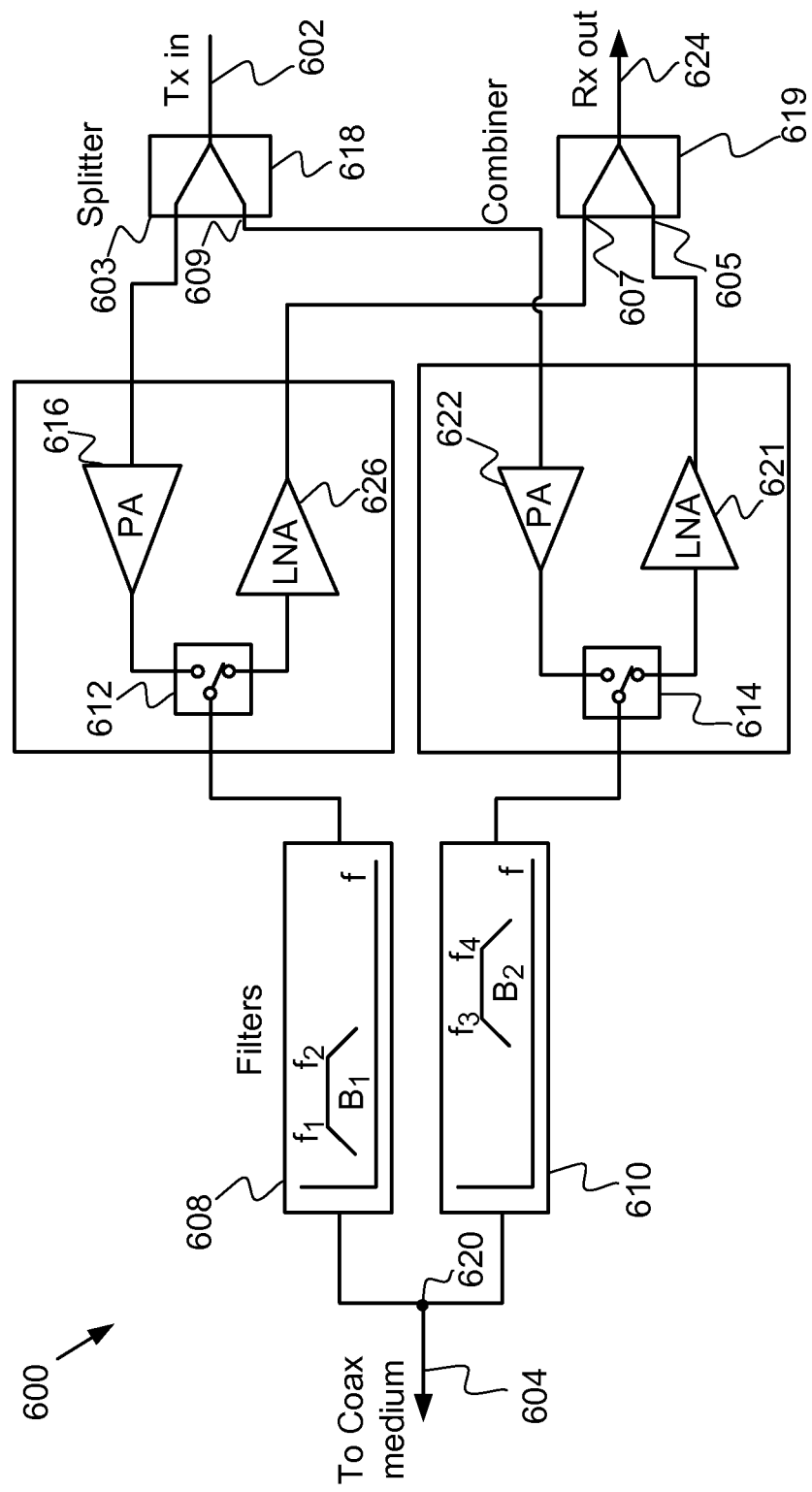
FIG. 6 is a simplified block schematic of a transmit/receive diplexer.

FIG. 6 is a simplified block schematic of a transmit/receive diplexer 600. In one of the three transmit modes, the diplexer 600 couples signals to be transmitted from diplexer transmit input port 602 onto a coaxial cable or other medium connected to a diplexer coaxial cable port 604. In one of the three receive modes, the diplexer 600 will receive signals at the diplexer coaxial cable port 604 and couple them to the diplexer receive output port 624. It will be understood by those skilled in the art that the diplexer coaxial cable port 604 can be coupled to any medium or circuit. However, in order to make clear the context of one embodiment of the disclosed method and apparatus, the diplexer coaxial cable port 604 is discussed in the context of a coaxial cable port.

The diplexer 600 has two filters 608, 610 and operates in one of four modes. In the first mode, the first Tx/Rx switch 612 is set to couple the output of a first PA 616 to a first terminal of the first filter 608. The input to the PA 616 is coupled to a first isolation port 603 of a splitter 618. The second terminal of the first filter 608 is coupled to a common connection point 620. The second Tx/Rx switch 614 is set to couple the input of a first LNA 621 to a first terminal of the second filter 610. The output of the first LNA 621 is coupled to the first isolation port 605 of a combiner 619. A second terminal of the second filter 610 is coupled to the common connection point 620.

Accordingly, signals that are input at the diplexer transmit input port 602 of the diplexer 600 are coupled to the common port of the splitter 618. Those signals that are within the pass band of the first filter 608 are transmitted out the diplexer coaxial cable port 604 to a coaxial cable or other medium. Signals presented to the diplexer transmit input port 602 of the diplexer and that are outside of the pass band of the filter 608 are rejected.

Concurrently, signals received at the diplexer coaxial cable port 604 are applied to the filter 610. Signals within the pass band of the filter 610 are coupled through the second switch 614 to the input to first LNA 621. These signals are then applied to the first isolation port 605 of the combiner 619 and output from the common port of the combiner 619 to the diplexer receive output port 624.

Therefore, in the first mode, signals in the passband of the first filter 608 are transmitted and signals in the passband of the second filter 610 received.

In the second mode, the Tx/Rx switches 612, 614 are each thrown in the other direction (the opposite position from the position of the first mode). Therefore, the first filter 608 is coupled to the input of the LNA 626. The output of the LNA 626 is coupled a second isolation port 607 of the combiner 619. The second filter 610 is coupled to the output of the second PA 622. The input to the PA 622 is coupled to the second isolation port 609 of the splitter 618. Accordingly, in the second mode, signals in the passband of the first filter 608 are received and signals in the passband of the second filter 610 are transmitted.

In the third mode, the first Tx/Rx switch 612 is set to couple the output of the first PA 616 to a first terminal of the filter 608. The input to the PA 616 is coupled to the first isolation port 603 of the splitter 618. A second terminal of the first filter 608 is coupled to the common connection point 620 which is coupled to the diplexer coaxial cable port 604. The second Tx/Rx switch 614 is set to couple the output of a second PA 622 to a first terminal of the second filter 610. The input to the second PA 622 is coupled to the second isolation port of the splitter 618. A second terminal of the second filter 610 is coupled to the common connection point 620. Accordingly, signals that are applied to the diplexer transmit input port 602 are split and coupled to the two filters 608, 610. The signals are then recombined at the common connection point 620 and output together at the diplexer coaxial cable port 604.

In the fourth mode, both filters 608, 610 are used for receiving. The first Tx/Rx switch 612 is set to couple the first filter 608 to the LNA 626. The second Tx/Rx switch 614 is set to couple a first terminal of the second filter 610 to the LNA 621. Accordingly, signals that are presented at the diplexer coaxial cable port 604 and that are within the pass band of the first filter 608 are coupled to the first isolation port 607 of the combiner 619. Signals presented at the diplexer coaxial cable port 604 that are within the pass band of the second filter 610 are coupled to the second isolation port 605 and combined with the signals at the first isolation port 607. The combined signals are output from the combiner 619 to the diplexer receive output port 624.

The diplexer 600 allows for selection of a low pass band, a high pass band or a broad band in both the receive and transmit modes. The diplexer 600 requires only two filters and two SPDT switches. In an alternative embodiment, the Tx/Rx switches 612, 614 have a third position in which the associated filter 608, 610 is disconnected. When one of the Tx/Rx switches is in this third position, either one frequency band is received or one frequency band is transmitted.

In one embodiment of the diplexer 600, the high frequency 3 dB cutoff for the filter 608 is at the same frequency as the low frequency 3 dB cutoff for the filter 610. Accordingly, when both filters are used in receive mode or both filters are used in transmit mode, a flat frequency response will be achieved from the low frequency end $f_1$ of the filter 608 to the high frequency end $f_4$ of the filter 610. In another embodiment, the high frequency 3 dB cutoff for the filter 608 is at a lower frequency than the low frequency 3 dB cutoff for the filter 610. Thus, a notch will be created in the frequency response of the diplexer at frequencies between the high frequency 3 dB cutoff for the filter 608 and the low frequency 3 dB cutoff for the filter 610. In one embodiment, the filters are dynamically tunable to determine the bandwidth of each filter in each mode.

The amplifiers 616, 621, 622, 626 provide gain to compensate for the insertion loss suffered through the splitter 618 and combiner 619. In one embodiment, when a switch 612, 614 removes an amplifier from the signal path, that amplifier can be turned off to both save power and reduce the amount of noise coupled to the output signal.

It should be noted that the isolation through the switches 612, 614 in the off position should be at least as great as the rejection of the filter that is operational for those frequencies that are in the pass band of the filter that is not operational. That is, if there is significant leakage through the switches 612, 614, the selection of just one band will not be effective, since some of the power in the other band will leak through the switch 612, 614. While the noise of the two LNAs 621, 626 will increase the overall noise figure of the diplexer, the elimination of one switch before the LNA (i.e., on the other side of the filters 608, 610) offsets the increase in noise figure.

Figure 7:
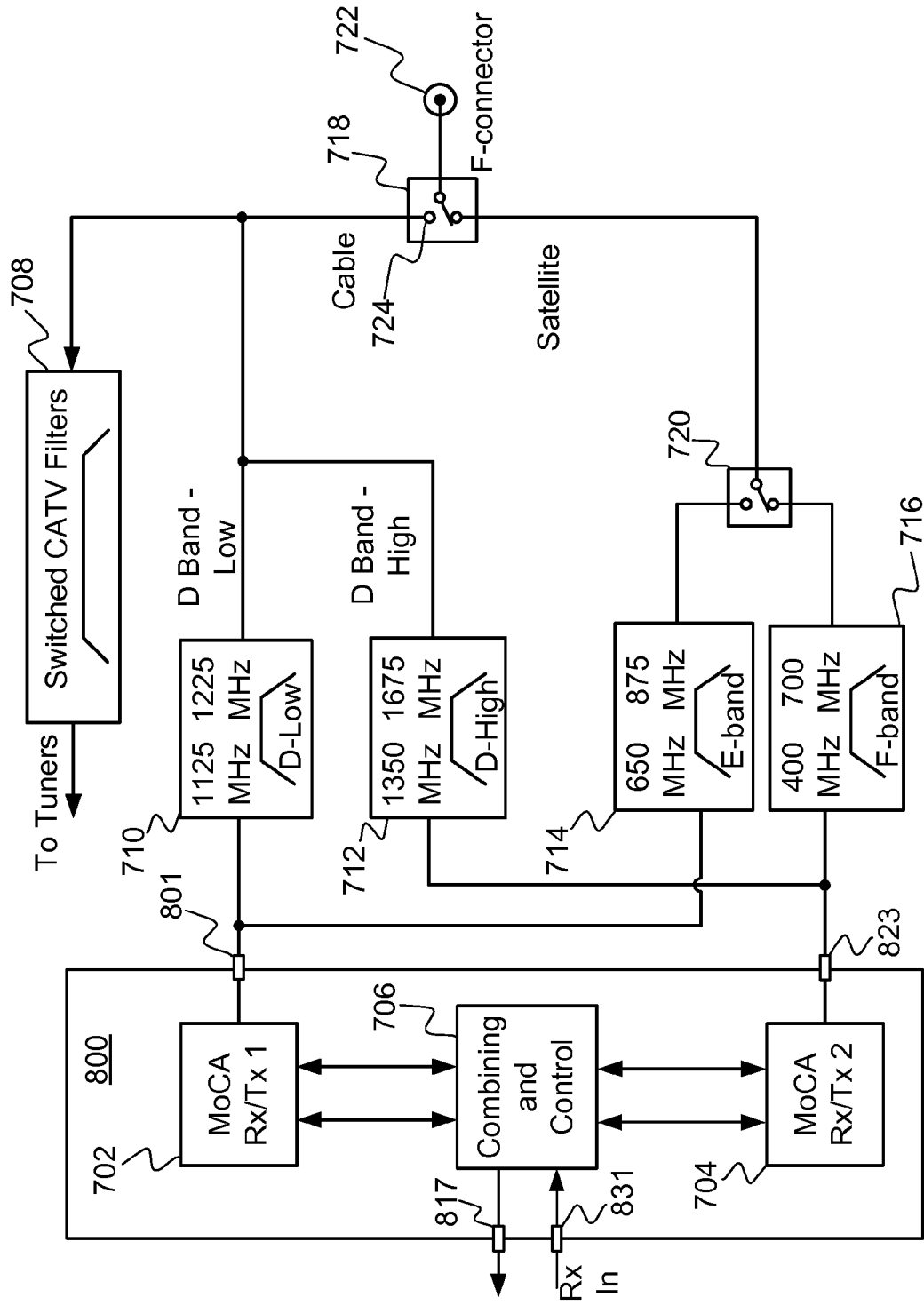
FIG. 7 is a simplified block diagram of a universal diplexer.

FIG. 7 is a simplified block diagram of a diplexer 700. The diplexer 700 includes an Rx/Tx selection and combining module 800. The Rx/Tx selection and combining module 800 includes a first MoCA Tx/Rx module 702, a second MoCA Tx/Rx module 704, and a combining/splitter module 706. The diplexer 700 also includes five filters 708, 710, 712, 714, 716, a cable/satellite switch 718, an E-band/F-band switch 720 and an "F connector" 722. The diplexer 700 has two high level modes. The first high level mode is cable mode. The second high level mode is satellite mode. In cable mode, the cable/satellite switch 718 is in the cable position (the position that is not shown in the FIG. 7).

In cable mode, the F connector 722 is coupled through the pole of the cable/satellite switch 718 to the cable throw 724. The cable throw 724 of the switch 718 is coupled to three of the filters 708, 710, 712. In one embodiment, the first filter 708 passes signals in the CATV band. Accordingly, satellite television signals received on the F-connector 722 are passed through the filter 708 to tuners required to display the television signals for viewing. The second filter 710 is a D band-low filter that passes signals in the range of 1125 to 1225 MHz. The third filter 712 is a D band-high filter that passes signals in the range of 1350 to 1675 MHz. These frequency bands commonly carry communications that conform to the well-known MoCA standard for home entertainment network communications. In particular, these frequency bands are typically used together when a medium, such as coaxial cabling, is shared by a MoCA network and CATV signals.

In satellite mode, the F connector 722 is coupled through the pole of the cable/satellite switch 718 to the satellite throw 726. The satellite throw 726 is coupled to the pole of the E-band/F-band switch 720. The E-band/F-band switch 720 has two positions. In the first position, the pole is connected to the E-band filter 714 having a pass band in the range of 650 to 875 MHz. In the second position, the pole of the E-band/F-band switch 720 is connected to the F-band filter 716 having a pass band of 400 to 700 MHz. These two filters commonly carry MoCA signals when a medium, such as coaxial cabling, is shared by a MoCA network and satellite television signals.

In the satellite mode, the satellite signals are rejected from being passed to the MoCA Rx/Tx modules 702, 704. Since satellite signals are in the pass band of the D-band filters 710, 712, the isolation of the cable/satellite switch 724 must be at least greater than the rejection of the E-band and F-band filters 714, 716.

Figure 8:
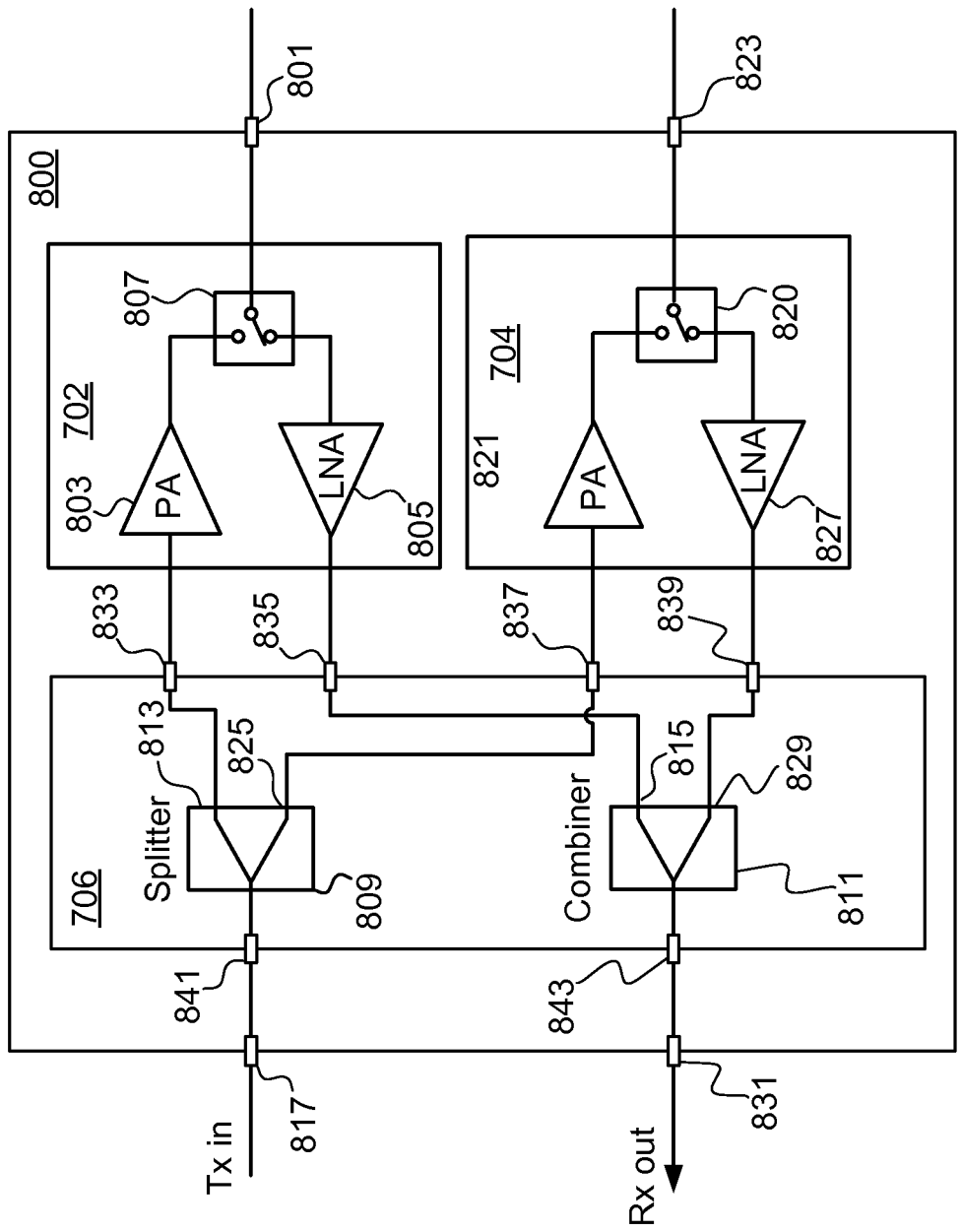
FIG. 8 provides details regarding one embodiment of the Rx/Tx selection and combining module of FIG. 7.

FIG. 8 provides details regarding one embodiment of the Rx/Tx selection and combining module 800. A first filter port 801 of the Rx/Tx selection and combining module 800 couples two of the filters 710, 714 (see FIG. 7) to the first MoCA Rx/Tx module 702. The first MoCA Rx/Tx module 702 includes a PA 803, LNA 805 and Rx/Tx switch 807. In accordance with one embodiment, the combining/splitting module 706 includes a splitter 809 and a combiner 811. The input to the PA 803 is coupled to one of two isolation outputs 813 of the splitter 809. The output from the LNA 805 is coupled to one two isolation inputs to the combiner 811. Accordingly, when the Rx/Tx switch 807 is in the transmit mode, inputs received from the filters 710, 714 through the port filter 801 are amplified by the PA 803 and coupled to a transmit output port 817.

When the Rx/Tx switch 807 is in the receive mode, the filters 710, 714 are coupled to the input of the LNA 805. The output of the LNA 805 is coupled to a first of two isolation inputs 815 to the combiner 811.

An Rx/Tx switch 820 within the second MoCA Rx/Tx module 704 selects between transmit and receive modes for signals that fall within the pass band of either the F-band filter 716 or the D band-High filter 712. When the MoCA Rx/Tx module 704 is in transmit mode, the output of the PA 821 is coupled to a second filter port 823. The input to the PA 821 is coupled to a second isolated output 825 of the splitter 809. The second filter port 823 is coupled to the D band-High filter 712 and to the F-band filter 716. Thus, when the cable/satellite switch 718 shown in FIG. 7 is in cable mode, signals in the frequency range D band-High (i.e., 1350-1675 MHz) coupled to the transmit output port 817 will be amplified by and routed through the Rx/Tx selection and combining module 800 to the F-connector 722. Likewise, when the cable/satellite switch 718 is in the satellite mode, signals in the frequency range F-band (i.e., 400-700 MHz) coupled to the transmit input port 817 will be amplified by and routed through the Rx/Tx selection and combining module 800 to the F-connector 722 for transmission.

When the Rx/Tx switch 820 in the MoCA Rx/Tx module 704 is in receive mode, the input to the LNA 827 is coupled to the second filter port 823. The output from the LNA 827 is coupled to a second isolated output 829 of the combiner 811. As noted above, the second filter port 823 is coupled to the D band-High filter 712 and to the F-band filter 716. Thus, when the cable/satellite switch 718 shown in FIG. 7 is in cable mode, signals in the frequency range D band-High (i.e., 1350-1675 MHz) coupled to the F-connector 722 will be amplified by and routed through the Rx/Tx selection and combining module 800 to the receiver output port 831. Likewise, when the cable/satellite switch 718 is in the satellite mode, signals in the frequency range F-band (i.e., 400-700 MHz) coupled to the F-connector 722 will be amplified by and routed through the Rx/Tx selection and combining module 800 to the receive output port 831.

When the diplexer 700 is in satellite mode (i.e., the cable/satellite switch 718 is in satellite position) there are four modes possible. In the first mode, the MoCA Rx/Tx 702 is in transmit mode and the E-band/F-band switch 720 is in E-band mode. In the second mode, the MoCA Rx/Tx 702 is in receive mode and the E-band/F-band switch 720 is in E-band mode. In the third mode, the MoCA Rx/Tx 704 is in transmit mode and the E-band/F-band switch 720 is in F-band mode. In the fourth mode, the MoCA Rx/Tx 704 is in receive mode and the E-band/F-band switch 720 is in F-band mode. It should be noted that when the E-band/F-band switch 720 is in E-band mode, the amplifiers in the MoCA Rx/Tx module 704 can be turned off. Likewise, when the E-band/F-band switch 720 is in F-band mode, the amplifiers in the MoCA Rx/Tx module 702 can be turned off.

There are also four possible modes when the diplexer 700 is in cable mode. In the first mode, the MoCA Rx/Tx module 702 is in transmit mode and the MoCA Rx/Tx module 704 is in receive mode. In this case, MoCA signals are received on the D band-High frequency and transmitted on the D band-low frequency. In the second mode, the MoCA Rx/Tx module 702 is in receive mode and the MoCA Rx/Tx modules 704 is in transmit mode. In this case, MoCA signals are transmitted on the D band-High frequency and received on the D band-low frequency. In the third mode, both MoCA Rx/Tx modules 702, 704 are in transmit mode. Accordingly, MoCA signals are transmitted on the full D-band. In the fourth mode, both MoCA Rx/Tx modules 702, 704 are in receive mode. Therefore, MoCA signals are received on the full D-band.

In one embodiment, either the high frequency 3 dB cutoff of the filter 710 can be shifted up or the low frequency 3 dB cutoff of the filter 712 can be shifted down such that the two filters to cross over at the same point 3 dB cutoff frequency. Alternatively, these 3 dB cutoff frequencies can both be shifted to meet in the middle. Such filter adjustments can be done dynamically using tunable filters, or the filters can be designed with a fixed band having the adjusted 3 dB cutoff frequencies. By adjusting these 3 dB cutoff frequencies, the combined pass band created when the MoCA Rx/Tx modules 702, 704 are either both in transmit mode or both in receive mode will cover the full spectrum from the lower end
    of the filter 710 to the upper end of the filter 712.

FIG. 9 is a simplified block diagram of an alternative embodiment of a diplexer 900. The diplexer 900 is essentially identical to the diplexer 700 except that the F-band filter 902 passes only a portion (400-600 MHz) of the full F-band passed by the F-band filter 716. Therefore, the pass band of the E-band filter 904 and the partial F-band filter 902 do not overlap. Since the pass band of the E-band filter 904 and the partial F-band filter 902 do not overlap, the E-band/F-band switch 720 can be eliminated from the diplexer 900. Accordingly, the filters 902, 904 are each coupled directly to the cable/satellite switch 718.

Therefore, when both MoCA Rx/Tx modules 702, 704 are in transmit mode, and the cable/satellite switch 718 is in satellite mode, the full Mid-RF band (i.e., 400-875 MHz) is available for MoCA transmissions. Likewise, when both MoCA Rx/Tx modules 702, 704 are in receive mode, and the cable/satellite switch 718 is in satellite mode, the full Mid-RF band (i.e., 400-875 MHz) is available to receive MoCA signals.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

It should be understood by those skilled in the art that while the particular embodiments disclosed are described in the context of a system in which MoCA, cable television, and satellite signals share a common medium, the particular frequencies of the filters may vary without departing from the scope of the invention. Furthermore, the particular types of signals and networks that are being diplexed and combined should not be taken as a limitation on the scope of the claimed invention. The presently disclosed method and apparatus can be implemented with any type of signals and networks. Furthermore, the concepts that are disclosed herein can be expanded to systems in which more filters are used by daisy chaining several of the disclosed diplexers together. Alternatively, transmit/receive diplexers like those of FIG. 6 can be selected from a bank of diplexers. When a particular diplexer is selected, the diplexer can pass signals that are within the pass band of only one or only the other filter or that are in the pass band of either one of the two filters.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A channel selector comprising:
   a first filter and a second filter, the first filter and the second filter each having a first terminal and a second terminal;

a first switch and a second switch, the first switch and the second switch each having a pole and two throws, the pole of the first switch being coupled to the first terminal of the first filter and the pole of the second switch being coupled to the first terminal of the second filter;

a first power amplifier and a second power amplifier, the first power amplifier and the second power amplifier each having an input and an output, the output of the first amplifier being coupled to the first throw of the first switch and the output of the second amplifier being coupled to the first throw of the second switch;

a first low noise amplifier and a second low noise amplifier, the first low noise amplifier and the second low noise amplifier each having an input and an output, the input to the first low noise amplifier being coupled to the second throw of the first switch and the input of the second low noise amplifier being coupled to the second throw of the second switch;

a splitter having a first isolation port, a second isolation port, and a common port, the first isolation port of the splitter being coupled to the input of the first power amplifier, the second isolation port of the splitter being coupled to the input of the second power amplifier; and a combiner having a first isolation port, a second isolation port, and a common port, the first isolation port of the combiner being coupled to the output of the first low noise amplifier and the second isolation port of the combiner being coupled to the output of the second low noise amplifier.

2. The channel selector of claim 1, wherein the first filter has a frequency response that passes signals in the lower frequency range of the D-Band used for transmission of cable television signals over coaxial cable and wherein the second filter has a frequency response that passes signals in the higher frequency range of the D-Band used for transmission of cable television signals over coaxial cable, the 3 dB cutoff at the high end of the frequency response of the first filter being no higher in frequency than the low 3 dB cutoff at the low end of the frequency response of the second filter.

3. The channel selector of claim 1, wherein the first filter has a frequency response that passes signals in the lower frequency range of the E-Band used for transmission of satellite television signals over coaxial cable and wherein the second filter has a frequency response that passes signals in the higher frequency range of the E-Band used for transmission of satellite television signals over coaxial cable, the 3 dB cutoff at the high end of the frequency response of the first filter being no higher in frequency than the low 3 dB cutoff at the low end of the frequency response of the second filter.

4. A receive/transmit selection and combining module comprising:

a splitter having a first isolation port, a second isolation port, and a common port;

a combiner having a first isolation port, a second isolation port, and a common port;

a first power amplifier and a second power amplifier, the first power amplifier and the second power amplifier each having an input and an output, the input of the first power amplifier being coupled to the first isolation port of the splitter, the input of the second power amplifier being coupled to the second isolation port of the splitter;

a first low noise amplifier and a second low noise amplifier, the first power low noise amplifier and the second low noise amplifier each having an input and an output, the input of the first low noise amplifier being coupled to the first isolation port of the combiner and the output of the second low noise amplifier being coupled to the second isolation port of the combiner; and a first single pole, double throw (SPDT) switch and second SPDT switch, the first throw of the first SPDT switch being coupled to the output of the first power amplifier, the second throw of the first SPDT switch being coupled to the input of the first low noise amplifier, the first throw of the second SPDT switch being coupled to the output of the second power amplifier, and the second throw of the second SPDT switch being coupled to the input of the second low noise amplifier.

5. A diplexer comprising:

a first filter having a first terminal and a second terminal;

a second filter having a first terminal and a second terminal, the second terminal of the first filter being coupled to the second terminal of the second filter, wherein the first filter has a frequency response with a high frequency 3 dB cutoff point that is equal to or lower in frequency than the low frequency 3 dB cutoff point of the second filter;

a third filter having a first terminal and a second terminal, the first terminal of the first filter being coupled to the first terminal of the third filter;

a fourth filter having a first terminal and a second terminal, the first terminal of the second filter being coupled to the first terminal of the fourth filter a first single pole double throw (SPDT) switch, the first throw of the first SPDT switch being coupled to the second terminal of the third filter and the second throw of the first SPDT switch being coupled to the second terminal of the fourth filter;

a second SPDT switch, the first throw of the second SPDT switch being coupled to the second terminal of the first filter and the second throw of the second SPDT switch being coupled to the pole of the first SPDT switch; and a receive/transmit selection and combining module comprising:

a first filter port;

a second filter port;

a splitter having a first isolation port, a second isolation port, and a common port;

a combiner having a first isolation port, a second isolation port, and a common port;

a first power amplifier and a second power amplifier, the first power amplifier and the second power amplifier each having an input and an output, the input of the first power amplifier being coupled to the first isolation port of the splitter, the input of the second power amplifier being coupled to the second isolation port of the splitter;

a first low noise amplifier and a second low noise amplifier, the first low noise amplifier and the second low noise amplifier each having an input and an output, the input of the first low noise amplifier being coupled to the first isolation port of the combiner and the input of the second low noise amplifier being coupled to the second isolation port of the combiner; and a third SPDT switch and a fourth SPDT switch, the first throw of the third SPDT switch being coupled to the output of the first power amplifier, the second throw of the third SPDT switch being coupled to the input of the first low noise amplifier, the pole of the third switch being coupled to the first filter port, the first throw of the fourth SPDT switch being coupled to the output of the second power amplifier, the second throw of the fourth SPDT switch being coupled to the input of the second low noise amplifier, and the pole of the fourth switch being coupled to the second filter port.

6. The channel selector of claim 5, wherein the first filter has a frequency response that passes signals in the lower frequency range of the D-Band used for transmission of cable television signals over coaxial cable and wherein the second filter has a frequency response that passes signals in the higher frequency range of the D-Band used for transmission of cable television signals over coaxial cable, the 3 dB cutoff at the high end of the frequency response of the first filter being no higher in frequency than the low 3 dB cutoff at the low end of the frequency response of the second filter.

7. The channel selector of claim 5, wherein the third filter has a frequency response that passes signals in the frequency range of the E-Band used for transmission of satellite television signals over coaxial cable and wherein the fourth filter has a frequency response that passes signals in the frequency range of the F-Band used for transmission of satellite television signals over coaxial cable, the 3 dB cutoff at the high end of the frequency response of the third filter being no higher in frequency than the low 3 dB cutoff at the low end of the frequency response of the fourth filter.

8. The diplexer of claim 5, wherein at least one of the first filter, the second filter, the third filter, and the fourth filter comprise an adjustable frequency response.

9. The diplexer of claim 5, wherein the diplexer comprises a fifth filter having a first terminal coupled to the first throw of the second SPDT switch.

10. The diplexer of claim 9, wherein the frequency response of the fifth filter will pass signals in the CATV band.

11. A diplexer comprising:
a first filter having a first terminal and a second terminal;
a second filter having a first terminal and a second terminal, the second terminal of the first filter being coupled to the second terminal of the second filter, wherein the first filter has a frequency response with a high frequency 3 dB cutoff point that is equal to or lower in frequency than the low frequency 3 dB cutoff point of the second filter;
a third filter having a first terminal and a second terminal, the first terminal of the first filter being coupled to the first terminal of the third filter;
a fourth filter having a first terminal and a second terminal, the first terminal of the second filter being coupled to the first terminal of the fourth filter, wherein the third filter has a frequency response with a high frequency 3 dB cutoff point that is equal to or lower in frequency than the low frequency 3 dB cutoff point of the fourth filter;
a first single pole double throw (SPDT)switch, the first throw of the first SPDT switch being coupled to the second terminal of the first filter, the second throw of the first SPDT switch being coupled to the second terminal of the third filter, the second throw of the first SPDT switch also being coupled to the second terminal of the fourth filter; and
a receive/transmit selection and combining module comprising:
a first filter port;
a second filter port;
a splitter having a first isolation port, a second isolation port, and a common port;
a combiner having a first isolation port, a second isolation port, and a common port;
a first power amplifier and a second power amplifier, the first power amplifier and the second power amplifier each having an input and an output, the input of the first power amplifier being coupled to the first isolation port of the splitter, the input of the second power amplifier being coupled to the second isolation port of the splitter;
a first low noise amplifier and a second low noise amplifier, the first power low noise amplifier and the second low noise amplifier each having an input and an output, the input of the first low noise amplifier being coupled to the first isolation port of the combiner and the input of the second low noise amplifier being coupled to the second isolation port of the combiner; and
a third SPDT switch and a fourth SPDT switch, the first throw of the third SPDT switch being coupled to the output of the first power amplifier, the second throw of the third SPDT switch being coupled to the input of the first low noise amplifier, the pole of the third switch being coupled to the first filter port, the first throw of the fourth SPDT switch being coupled to the output of the second power amplifier, the second throw of the fourth SPDT switch being coupled to the input of the second low noise amplifier, and the pole of the fourth switch being coupled to the second filter port.

12. The diplexer of claim 11, wherein the diplexer comprises a fifth filter having a first terminal coupled to the first throw of the first SPDT switch.

13. A method of selecting between transmission and reception of signals from a combined signal, the method comprising:
receiving a signal within a common port of a splitter;
coupling an output of a first isolation port of the splitter to the input of a first power amplifier;
coupling an output of a second isolation port of the splitter to the input of a second power amplifier;
coupling an output of the first power amplifier to a first throw of a first single pole, double throw (SPDT) switch;
coupling an output of a second power amplifier to the input of a first throw of a second SPDT switch;
coupling the pole of the first SPDT switch to a first terminal of a first filter;
coupling the pole of the second SPDT switch to a first terminal of a second filter;
coupling a second terminal of the first filter to a second terminal of the second filter;
coupling a second throw of the first SPDT switch to the input of a first low noise amplifier;
coupling a second throw of the second SPDT switch to the input of a second low noise amplifier;
coupling an output of the first low noise amplifier to a first isolation input of a combiner;
coupling an output of the second low noise amplifier to a second isolation input of the combiner;
selecting between the first throw of the first SPDT switch and the second throw of the first SPDT switch; and
selecting between the first throw of the second SPDT switch and the second throw of the second SPDT switch;
wherein selecting between the first throw of the first SPDT switch and the second throw of the first SPDT switch and selecting between the first throw of the second SPDT switch and the second throw of the second SPDT switch enables a selection of one or more of:
transmission of signals having a frequency within a low-pass band;
reception of signals having a frequency within the low-pass band;
transmission of signals having a frequency within the high-pass band reception of signals having a frequency within the high-pass band;
transmission of signals having a frequency within a band-pass band; and
reception of signals having a frequency within the band-pass band.

* * * * *